United States Patent [19]
Jones et al.

[11] Patent Number: 6,020,947
[45] Date of Patent: Feb. 1, 2000

[54] LIQUID CRYSTAL DEVICES

[75] Inventors: John Clifford Jones, Leigh Sinton; Simon David Haslam, Wyesham; Robert William Bannister, Malvern, all of United Kingdom

[73] Assignees: Sharp Kabushiki Kaisha, Osaka, Japan; The Secretary of State for Defence in Her Brittanic Majesty's Government of the United Kingdom of Great Britain and Northern Ireland, Hants, United Kingdom

[21] Appl. No.: 08/963,148

[22] Filed: Nov. 3, 1997

[30] Foreign Application Priority Data

Nov. 6, 1996 [GB] United Kingdom .................. 9623120
Nov. 6, 1996 [GB] United Kingdom .................. 9623121

[51] Int. Cl.$^7$ .............................. C09K 19/02; G02F 1/13
[52] U.S. Cl. ........................... 349/172; 349/184; 349/188
[58] Field of Search ................... 349/172, 184, 349/188, 134

[56] References Cited

U.S. PATENT DOCUMENTS

| | | | |
|---|---|---|---|
| 4,879,144 | 11/1989 | Nakura et al. ............................... 428/1 |
| 5,404,237 | 4/1995 | Katsuse et al. ............................. 359/56 |
| 5,453,861 | 9/1995 | Shinjo et al. .............................. 359/78 |
| 5,500,749 | 3/1996 | Inaba et al. ............................... 359/56 |
| 5,529,717 | 6/1996 | Murashiro et al. ................... 252/299.61 |
| 5,543,943 | 8/1996 | Hanyu et al. .............................. 359/43 |
| 5,557,435 | 9/1996 | Hanyu et al. .............................. 359/75 |
| 5,646,754 | 7/1997 | Takeda et al. ............................ 349/172 |
| 5,800,736 | 9/1998 | Okabe et al. ....................... 252/299.61 |
| 5,895,107 | 4/1999 | Haslam .................... 349/172 |
| 5,897,189 | 4/1999 | Sako et al. ............................... 349/171 |

FOREIGN PATENT DOCUMENTS

| 2187026 | 8/1987 | United Kingdom . |
| 2274519 | 7/1994 | United Kingdom . |
| 2313204 | 11/1997 | United Kingdom . |
| 2314168 | 12/1997 | United Kingdom . |

*Primary Examiner*—Rodney Bovernick
*Assistant Examiner*—Tarifur R. Chowdhury

[57] ABSTRACT

A ferroelectric liquid crystal display (FLCD), which comprises a cell including a layer of chiral smetic ferroelectric liquid crystal material contained between two substrates and at least one alignment layer for determining the surface alignment of the molecules in the liquid crystal material, is manufactured as follows. After selection of a suitable material for the alignment layer, the cell is filled by introducing liquid crystal material between the substrates to which the alignment layer is applied. After filling of the cell, a heat treatment is applied to the cell by raising the cell to an elevated temperature and maintaining the cell at that temperature for a predetermined period of time. The temperature and the period of time of this heat treatment are selected to cause the surface alignment properties of the alignment layer to be changed by the heat treatment in such a manner as to promote adoption of the C2 state by the liquid crystal material on subsequent cooling to the device operating temperature.

9 Claims, 3 Drawing Sheets

LIQUID CRYSTAL DEVICES

BACKGROUND OF THE INVENTION

This invention relates to liquid crystal devices, such as ferroelectric liquid crystal devices, and methods of manufacturing such devices.

The surface stabilised ferroelectric liquid crystal device (FLCD) possesses the advantage over other liquid crystal devices, such as the twisted nematic liquid crystal device, that it is a bistable device which can be switched between two states by switching pulses of alternate polarity and which will remain in one state in the absence of a switching pulse until a switching pulse of appropriate polarity is applied to switch it to the opposite state. By contrast, in a twisted nematic liquid crystal device, a drive signal must be applied continuously to maintain the device in one of its states.

A conventional FLCD cell comprises a layer of ferroelectric smectic liquid crystal material contained between two parallel glass substrates provided on their inside surfaces with electrode structures in the form of row and column electrode tracks which cross one another to form an addressable matrix array. Furthermore each of the inside surfaces of the substrates is provided with a suitable alignment layer which, prior to assembly of the substrates and filling of the cell with liquid crystal material, is treated by rubbing to impart a preferred surface alignment direction, and preferably a surface pretilt, to the contacting molecules of the liquid crystal material layer.

The switching behaviour of the liquid crystal molecules is dependent on the arrangement of the molecules in microlayers which, in the case of chiral smectic material, extend transversely of the substrates and adopt a chevron geometry having two possible states, C1 and C2, as disclosed in J. Kanbe et al, Ferroelectrics (1991), vol. 114, pp. 3. Both C1 and C2 states can form as the material cools down from the isotropic phase to the chiral smectic phase during device manufacture, and the boundaries between these two states may be seen as a zigzag defect. When used in a display device, material incorporating both the C1 and the C2 states can appear patchy, and it is therefore preferred that the material should be in one state for a practical device. The C2 state is preferred as it allows faster switching at lower voltages. Accordingly it is important that both the alignment layers provided on the substrates have surface alignment properties which are such as to promote formation of the C2 state on cooling of the liquid crystal material layer during manufacture of the device.

However little or no formation of the C2 state may occur with some liquid crystal materials when using a conventional device manufacturing method in which a bath of liquid crystal material is heated to a temperature at which the material is in the isotropic phase, the liquid crystal material is drawn under vacuum between the substrates of the cell, and the cell is then cooled down slowly so that the material passes from the isotropic phase through the cholesteric and smectic. A phases to the chiral smectic phase. Furthermore the C2 state may be unstable with temperature so that the proportion of the material in the C2 state may vary with temperature.

In a colour FLCD, such as may be used in a colour display, one of the substrates of the cell may incorporate a colour filter layer incorporating red, green and blue areas for each pixel of the cell. During manufacture of such a device the colour filter layer is applied prior to the application of the alignment layer to the substrate, and this imposes a limit to the temperature of the subsequent heat curing treatment which may be applied to polymerise and harden the alignment layer after spinning down of a liquid monomer on the substrate surface to form the alignment layer in known manner. Whereas the heat curing treatment may take place at a temperature of up to about 300° C. in a cell in which a colour filter layer is not provided, the heat curing treatment must generally take place at a temperature less than 180° C. in a cell in which such a colour filter layer is provided, in order not to adversely affect the colour filter layer. However such a lower temperature heat curing treatment may be insufficient to prevent the surface alignment properties of the alignment layer being significantly changed by heat treatments applied during further processing.

Furthermore spacer walls may be formed on at least one of the substrates for spacing the substrates apart when the substrates are connected together and for securing the substrates together over the entire surface area of the cell. Such spacer walls may be formed by an additional manufacturing step carried out prior to application of the alignment layer to the substrate, the additional manufacturing step typically comprising spinning down of a polyimide layer on the substrate and selective etching of the layer to form the spacer walls at the required locations. Subsequent to the formation of the spacer walls, the alignment layer is applied and rubbed to impart a preferred alignment direction, although the existence of the spacer walls can mean that it is difficult to properly rub all parts of the alignment layer. Furthermore the substrates are connected together by a heat bonding process, at a temperature of 150–180° C. for example, in order to bond the spacer walls on one of the substrates to the surface of the other substrate, and such heat bonding can significantly change the surface alignment properties of the alignment layer on the two substrates. If a lower temperature heat curing treatment as described above has previously been applied to one of the substrates, for example because the substrate incorporates a colour filter layer, such heat bonding can affect the surface alignment properties of the two alignment layers to different extents, thus producing the undesirable result that the two alignment layers have significantly different surface alignment properties in the manufactured device.

It is an object of the invention to provide an improved method of manufacturing a liquid crystal device, for example by promoting the C2 state in a ferroelectric liquid crystal device during manufacture.

SUMMARY OF THE INVENTION

According to the present invention there is provided a method of manufacturing a ferroelectric liquid crystal device which comprises a cell including a layer of chiral smectic ferroclectric liquid crystal material contained between two substrates and at least one alignment layer for determining the surface alignment of the molecules in the liquid crystal material, the method including the steps of:

(a) selecting a suitable material for said alignment layer of the cell;

(b) filling the cell by introducing liquid crystal material between the substrates of the cell to which said alignment layer is applied; and (c) after filling of the cell, applying a heat treatment to the cell by raising the cell to an elevated temperature and maintaining the cell at said temperature for a predetermined period of time, said temperature and said period of time being selected to cause the surface alignment properties of said alignment layer to be changed by the heat treatment in such a manner as to promote adoption of the C2 state by the liquid crystal material on subsequent cooling to the device operating temperature.

The application of such a heat treatment after filling of the cell with the liquid crystal material constitutes a high temperature annealing step which serves to increase or decrease the surface alignment properties, such as the pretilt, imparted by the alignment layer so that the C2 state becomes more stable below the chiral smectic transition temperature. This not only promotes the foron of the C2 state, but also ensures that the C2 state remains substantially unaffected by subsequent variations in temperature. Furthermore certain liquid crystal materials may be caused to adopt the C2 state which would not otherwise form the C2 state in use of a conventional device manufacturing method.

The invention further provides a method of manufacturing a liquid crystal device which comprises a cell including a layer of liquid crystal material contained between two substrates each of which is provided with an alignment layer for determining the surface alignment of the molecules in the liquid crystal material, the method including the steps of:

(a) applying a first alignment layer to a first substrate;

(b) applying a second alignment layer to a second substrate;

(c) heat treating the first and second substrates to cure the first and second alignment layers;

(d) rubbing the first and second alignment layers to provide the required surface alignment;

(e) connecting the first and second substrates together so that the first and second alignment layers face one another with a gab therebetween; and (f) filling the cell by introducing liquid crystal material between the first and second substrates;

wherein, in step (c), different heat treatments having different effects on the surface alignment properties of the first and second alignment layers are applied to the first and second substrates, and the first and second alignment layers are made of different materials and/or are differently processed in order to compensate for the effects of the different heat treatments so that the first and second alignment layers have similar surface alignment properties in the manufactured device.

By making the first and second alignment layers of different materials and/or by processing the alignment layers differently, similar surface alignment properties may be imparted to the first and second alignment layers even though different heat treatments are applied to the alignment layers. Thus, for example, if the first substrate incorporates a colour filter layer, a relatively low temperature heat treatment of less than 180° C. can be applied to the substrate to cure the first alignment layer whilst not adversely affecting the colour filter layer, whereas, if spacer walls are to be applied to the second substrate, a relatively high temperature heat treatment at a temperature substantially greater than 180° C., for example at a temperature of about 300° C., can be applied to the second substrate to fully harden the second alignment layer. Such high temperature curing of the second alignment layer enables the application of spacer walls on top of the second alignment layer by a process in which a layer of material is applied to the substrate and is subsequently etched, without the second alignment layer being removed by the etching treatment. This allows rubbing of the second alignment layer to impart a preferred alignment direction prior to application of the spacer walls, thus enabling the second alignment layer to be rubbed more uniformly than would be possible if the second alignment layer was applied on top of the spacer walls.

The invention also provides a liquid crystal device including a cell comprising a layer of liquid crystal material contained fist and second substrates provided with first and second alignment layers for determining the surface alignment of the molecules in the liquid crystal material, wherein the first and second alignment layers are made of different materials have inherently different surface alignment properties prior to heat treatment, different heat treatments having been applied to the first and second substrates during manufacture to cause the first and second alignment layers to have substantially similar surface alignment properties in the manufactured device.

BRIEF DESCRIPTION OF THE DRAWINGS

In order that the invention may be more fully understood, preferred methods in accordance with the invention will now be described, by way of example, with reference to the accompanying drawings, in which.

DETAILED DESCRIPTION OF THE DRAWINGS

Figure 1:
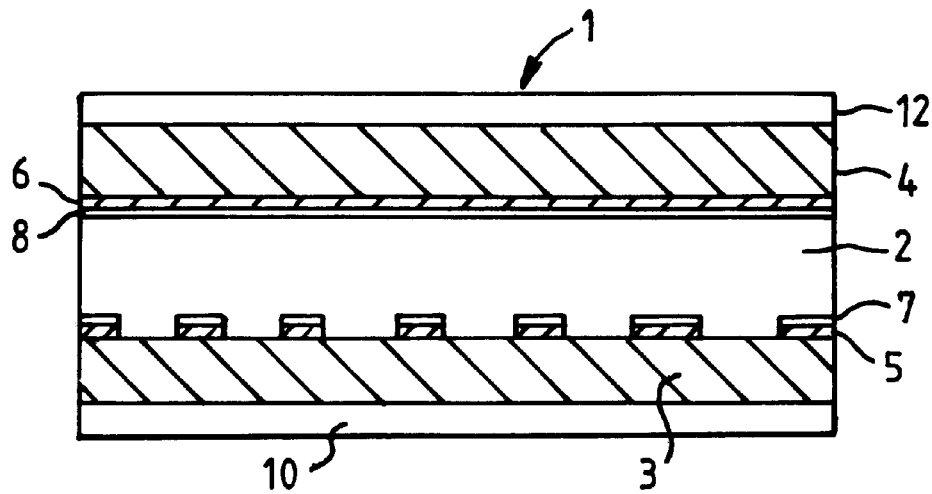
FIG. 1 diagrammatically shows a section through a FLCD cell.

FIG. 1 shows a typical structure of a FLCD cell 1 in which a ferroelectric liquid crystal material 2 in the chiral smectic phase is contained between two glass substrates 3 and 4 arranged parallel to one another and sealed at their edges. Transparent ITO (indium tin oxide) electrode structures 5 and 6 are applied to the inwardly directed faces of the substrates 3 and 4. Each of the electrode structures 5 and 6 is in the form of electrode tracks arranged parallel to one another, the tracks of the structure 5 being arranged in rows and the tracks of the structure 6 being arranged in columns extending perpendicularly to the rows so as to enable pixels at the intersections of the rows and columns to be addressed by the application of suitable strobe and data pulses to the intersecting tracks of the two electrode structures 5, 6.

A thin polymer alignment layer 7 or 8, for example a polyamide or polyimide alignment layer, is applied to the inwardly directed face of each electrode structure 5 or 6, each alignment layer being treated to provide a pretilt angle $\xi$ of about 2° to 10° to the surface, for example, and being rubbed in a required rubbing direction by buffing with a soft cloth made of rayon, for example, in order to impart a preferred alignment to the molecules of the liquid crystal material 2 in the vicinity of the alignment layers 7, 8. The rubbing directions of the two layers 7, 8 are typically parallel and in the same direction. As is well known the liquid crystal material is aligned during manufacture by cooling through the higher temperature phases to the required chiral smectic phase. When in the chiral smectic phase, the molecules are uniformly aligned in microlayers extending perpendicularly to the glass substrates 3, 4, the molecules in each microlayer adopting a chevron geometry due to the alignment of the molecules at the surfaces of the substrates 3, 4 on the two sides of the liquid crystal layer, and preferentially being aligned in the C2 state as referred to above, rather than in the C1 state.

Figure 2:
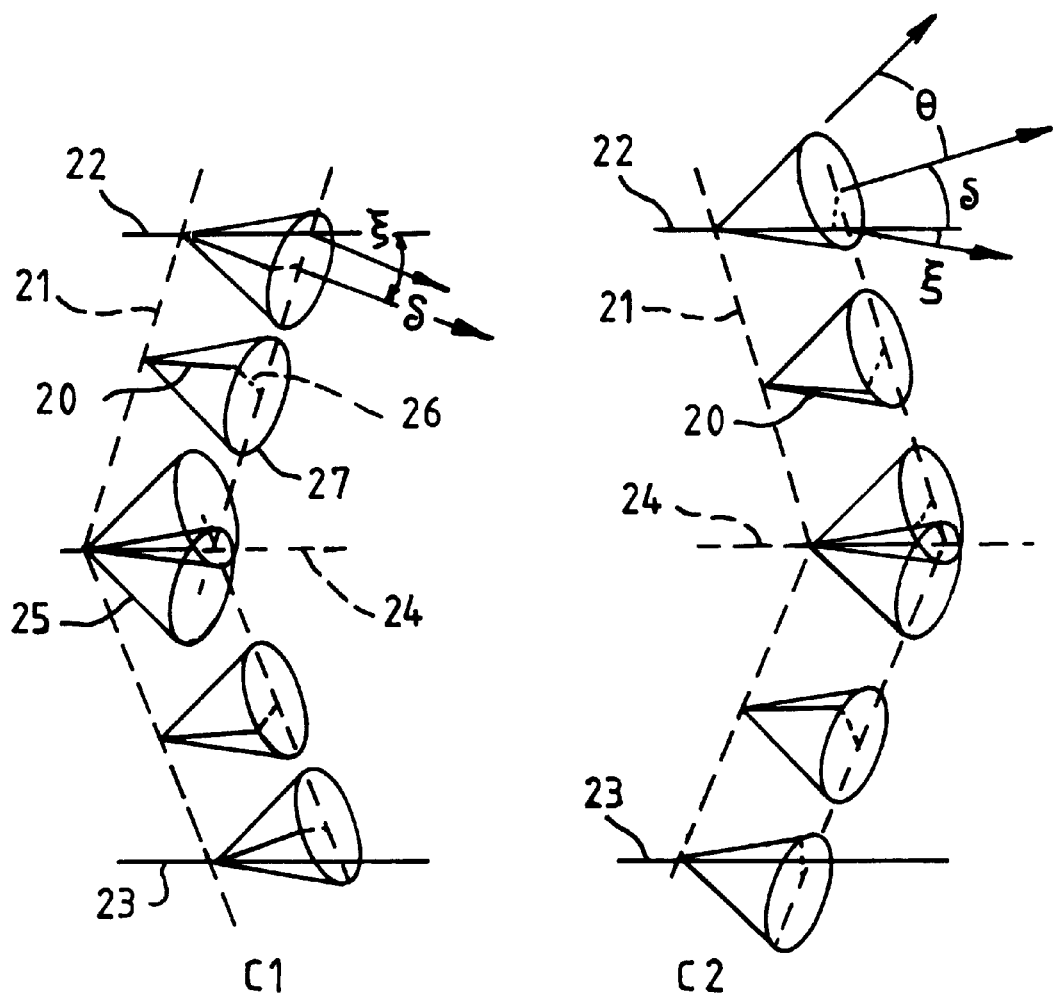
FIG. 2 is an explanatory diagram illustrating the two chevron states of the liquid crystal material in the FLCD cell.

The C1 and C2 states are shown diagrammatically in FIG. 2, the molecules 20 being shown in each case aligned in a microlayer 21 between the inner surfaces 22 and 23 of the cell substrates in the appropriate one of the two chevron states, which differ in the angles made at the chevron interface 24 midway between the surfaces 22 and 23. In this diagram the molecules 20 in each microlayer 21 are shown as if each molecular axis is on the surface of a cone 25 with the director 26 of each molecule being orientated at an appropriate angle in the plane of the base 27 of the cone 25. Strong aligning forces anchor the molecules 20 in a tilted and aligned direction adjacent to each of the substrate surfaces 22 and 23, the direction of tilt and the alignment direction being determined by the surface properties of the treated alignment layer, whereas the molecules 20 away from the substrate surfaces tend to arrange themselves in one of two stable positions on the surface of the cone 25. When a small d.c. electric field of appropriate polarity, amplitude and time is applied across the cell during switching by the data and strobe pulses, the molecules 20 rotate from one stable position on the surface of the cone 25 to the other stable position. The angle of the cone 25 around which each molecule 20 rotates is the cone angle $\theta$, the angle between the surface 22 or 23 and the microlayer 21 is $\delta$, and the surface tilt or pretilt angle of the molecules at the surface 22 or 23 is $\xi$. In the C2U state, which is the preferred form of the C2 state, the director profile of the molecules has mirror symmetry about the central plane of the cell, In other words, the chevrons are symmetric and both surfaces are of the same orientation.

Figure 3:
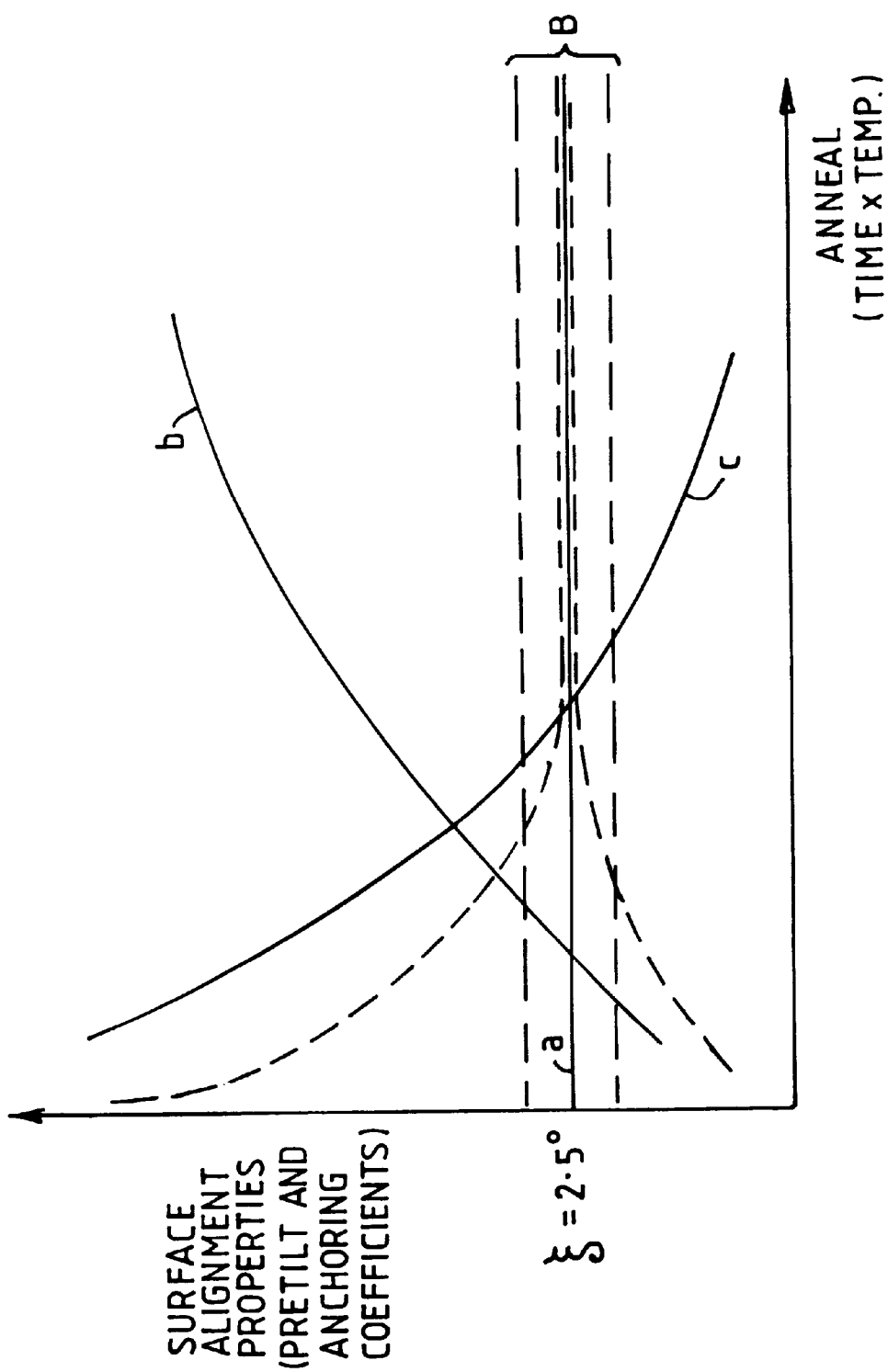
FIG. 3 is a graph of the surface alignment properties of the alignment layer against the product of time and temperature of an annealing treatment in such a cell.

FIG. 3 is a graph illustrating the effect of annealing of the cell on the surface alignment properties, that is the surface pretilt angle $\xi$ and the anchoring coefficients, of the alignment layer of the cell. The manner in which the surface alignment properties vary with the degree of annealing, that is the product of the temperature applied and the duration for which the temperature is applied, depends on the particular polymer chosen for the alignment layer and the treatment of the alignment layer. For example, it has been shown that the surface pretilt angle of five different polymers, that is the polymers SE130, SE7311, SE 4110 and SE610 supplied by Nissan and the polymer Probimide 32 supplied by Ciba-Geigy, vary in different ways with variation in the annealing time/temperatmne. In each case the pretilt angle was measured with the cell filled with liquid crystal material and after annealing and cooling to room temperature. Generally speaking, different polymers exhibit three different types of behaviour, and these are shown in FIG. 3 by the three curves a), b) and c). In the case of a) type polymers, the surface alignment properties, such as the pretilt angle, remain substantially constant with variations in the annealing time/temperature, whereas, in the case of b) type polymers, the pretilt angle increases with increasing annealing time/temperature and, in the case of c) type polymers, the pretilt angle decreases with increasing annealing time/temperature.

In a conventional FLCD manufacturing process the cell is filled by placing it above a bath of liquid crystal material heated to a temperature at which the material is in the isotropic phase, so that the bottom edges of the substrates are in contact with the material within the bath, and by then applying a vacuum so as to slowly draw the liquid crystal material upwardly between the substrates by capillary action, with the cell being maintained at a raised temperature during such filling. After filling of the cell, which may take a number of hours, the heat is removed and the cell is cooled down very slowly so that the liquid crystal material passes from the isotropic phase through the cholesteric and smectic A phases to the chiral smectic phase (usually the chiral smectic C phase) as the material cools. However one or more of these phases may be omitted in certain liquid crystal materials. Furthermore the polymer selected for the alignment layer and the surface treatment imparted prior to assembly and filling of the cell are selected to favour the C2 state on cooling of the liquid crystal material. Low or medium values of the pretilt angle tend to favour the C2 state, whereas high values of the pretilt angle tend to favour the C1 state. The relevant criteria are described in more detail in J. C. Jones, M. J. Towler, J. R. Hughes, "Fast, high contrast ferroelectric liquid crystal displays and the role of dielectric biaxiality", Displays (1993), vol. 14, no. 2, pp.86.

However the application of heat to the cell in such a process will itself change the surface alignment properties of the alignment layer, particularly where the alignment layer is formed from a polymer exhibiting b) or c) type behaviour as described above. Furthermore, the fact that the cell is filled progressively from bottom to top when the filling process referred to above is used means that the alignment layer will be annealed to a greater extent in the lower part of the cell than in the upper part of the cell, with the result that the surface alignment properties of the alignment layer will differ from the bottom to the top of the cell. This means that the surface alignment properties of the alignment layer may vary unpredictably after the manufacturing process has been completed with the result that the proportion of the liquid crystal material in the C2 state will also vary. This can mean that certain polymers, which otherwise exhibit desirable properties for promoting the formation of the C2 state in a FLCD, are ruled out of consideration for the alignment layer because they exhibit type b) or type c) behaviour as described above.

The invention proposes providing an annealing step in the manufacturing process so as to ensure that, whether the polymer used for the alignment layer is of type a), type b), or c), the surface alignment properties in the manufactured cell are such that the surface tilt angle $\xi \geq \theta - |\delta|$ is in a preferred band B centred on $\xi = 2.5°$, say extending between 2° and 3°, favouring formation of the C2 state. If, for example, a b) type polymer is selected for the alignment layer which is such as to provide a pretilt angle of substantially less than 2.5° when the cell has been filled, the annealing step may be applied at a temperature and for a time sufficient to increase the pretilt angle in the manner indicated by the curve b) in FIG. 3 until an optimum value is reached ensuring that the pretilt angle in the manufactured cell is as close as possible to 2.5° at the operating temperature. Conversely, if a c) type polymer is selected for the alignment layer which is such as to provide a pretilt angle of substantially more than 2.5° after filling of the cell, the annealing step may be applied at a temperature and for a time sufficient to decrease the pretilt angle in the manner indicated by the curve c) until an optimum value is reached ensuring that the pretilt angle is as close as possible to 2.5° in the manufactured cell at the operating temperate.

Thus, in a typical manufacturing process incorporating the annealing step of the invention, the cell is assembled in conventional manner after the application of alignment layers to the inside surfaces of the two substrates and after treatment of the alignment layers as described above, the polymer for the alignment layers being selected to have the appropriate surface alignment properties in the manufactured cell. After filling of the cell with liquid crystal material from a bath of liquid crystal material at an elevated temperature in the manner already described, the filled cell is subjected to the required annealing step, optionally after allowing the cell to cool to a temperature below the chiral smectic phase transition temperature, possibly even to room temperature. The annealing step may comprise heating the filled cell to a temperature at which the liquid crystal material is in the nematic or isotropic phase, for example a temperature of the order of 130° C., and then maintaining the cell at this temperature for the required period of time, for example one hour, to effect annealing of the cell. The temperature and duration of the annealing step will depend on the particular polymer used for the alignment layer, as well as on the surface alignment properties required in the manufactured cell, which will in turn depend on the particular liquid crystal material used in the cell. Typically the temperature will be in the range of 100° C. to 180° C., and the duration will be in the range of five minutes to three hours. When the annealing step has been completed, the heat is removed from the cell and the cell is slowly cooled, for example at a rate of 1° C. per minute, until the cell is at room temperature. At the completion of the cooling step the alignment layer has a surface pretilt angle, for example of about 2.5°, which is matched as closely as possible to the ideal angle for promoting formation of the C2V state in the liquid crystal material, so that the molecules of the liquid crystal material will tend to align themselves in the C2V state during cooling.

Figure 4:
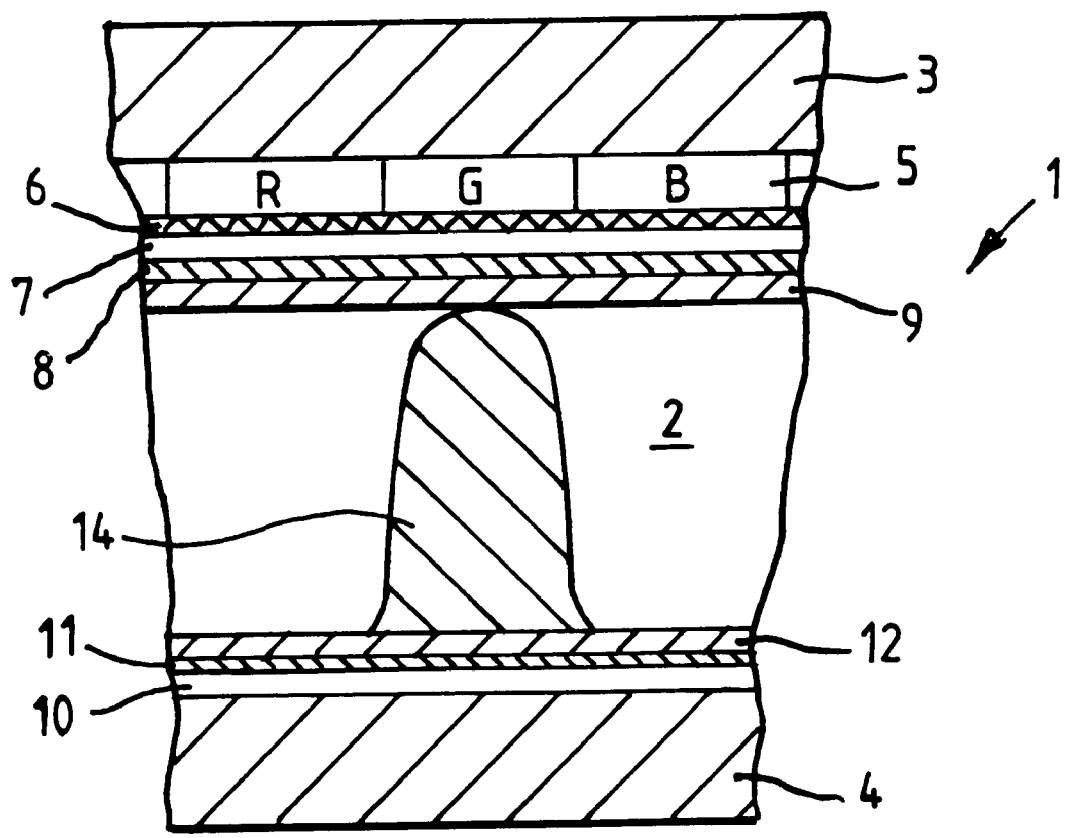
FIG. 4 is a diagrammatic section through part of a colour FLCD cell.

A further manufacturing method in accordance with the invention will now be described wit reference to the manufacture of a FLCD for use in a colour display which is shown diagrammatically in FIG. 4 and includes a cell 1' comprising a layer of chiral smetic ferroelectric liquid crystal material 2' contained between first and second substrates 3' and 4', the first substrate 3' incorporating a colour filter layer 15 and the second substrate 4' having spacer walls 14 applied thereto. However it should be understood that other types of liquid crystal device, which may or may not incorporate a colour filter layer or spacer walls, may also be produced by this further method. Furthermore the spacer walls 14 may be replaced by spacer beads or active spacers, or the spacers may be produced prior to over-coating with an alignment layer.

In order to manufacture the illustrated cell 1', the colour filter layer 15, incorporating red R, green G and blue B areas corresponding to each pixel, is applied to the first substrate 3' in known manner, and thereafter tree further layers are applied to the first substrate 3', namely a planarisation layer 16, an electrode structure 17 in the form of column tracks of transparent indium tin oxide, and a barrier layer 18, prior to the application of a first alignment layer 7'. No colour filter layer or planarisation layer is applied to the second substrate 4', although an electrode structure 19, in the form of row electrode tracks of transparent indium tin oxide, and a barrier layer 13 are applied in similar manner to the first substrate, prior to the application of the second alignment layer 8'.

Each of the first and second alignment layers 7' and 8' is applied by spinning down a layer of liquid monomer is known manner and by subsequently polymerising and hardening the layer by means of a heat treatment. However, instead of applying the same heat treatment to both alignment layers 7', 8' as would normally be expected, the first and second substrates 3' and 4' are subjected to different heat treatments so that the alignment layers 7' and 8' are cured to different extents. In the case of the first substrate 3' incorporating the colour filter layer 15, a relatively low temperature heat treatment at a temperature of less than 180° C. is applied for a relatively short period of time, for example half an hour, in order not to adversely affect the colour filter layer 15, whereas, in the case of the second substrate 4' to which the spacer walls 14 are to be applied, a relatively high temperature heat treatment at a temperature of about 300° C. is applied for a relatively long period of time, for example one to three hours. Each of the alignment layers 7', 8' is then rubbed, by buffing with a soft cloth made of rayon for example, to impart a preferred alignment direction to the layer in known manner.

The relatively high temperature heat treatment applied to the second substrate 4' serves to harden the second alignment layer 8' to such an extent as to enable the spacer walls 14 to be applied on top of the alignment layer 8' by means of a process in which a layer of a liquid polymer, such as polyimide, of a thickness corresponding to the required spacing apart of the substrates (typically 1500 nm) is spun down on the substrate, the layer being subsequently polymerised in known manner, for example by exposure to ultraviolet radiation through a mask, prior to being etched to remove the material of the layer in those areas in which spacer walls are not provided. This process leaves the material in position in those areas in which the spacer walls 14 are provided whilst ensuring that the hardened alignment layer 8' is not attacked by the etching treatment.

After processing of the first and second substrates 3', 4' in this manner, the substrates are connected together by applying pressure to press the substrates together whilst at the same time applying a heat bonding treatment, at a temperature of about 150–180° C. for a period of time of about 1 hour for example, so as to cause the spacer walls 14 on the second substrate 4' to bond to the first alignment layer 7' on the first substrate 3'. This further heat treatment will result in changing of the surface alignment properties, and particularly the pretilt angle $\xi$, of both alignment layers 7', 8', although the surface alignment properties of the first alignment layer 7' will be changed to a greater extent than the surface alignment properties of the second alignment layer 8' due to the fact that the first alignment layer 7' has been cured to a lesser extent.

In such a method in accordance with the invention, this difference in the extent to which the surface alignment properties of the alignment layers 7', 8' are changed by such further heat treatment, and also by any subsequent application of heat during filling of the cell 1 with liquid crystal material 2 or subsequent to such filling, may be compensated for by utilising different materials for the first and second alignment layers 7', 8', for example a material initially having a smaller pretilt angle $\xi$ for the first alignment layer 7' and a material initially having a greater pretilt angle $\xi$ for the second alignment layer 8', or vice versa.

Whilst it is preferred to utilise different materials for the first and second alignment layers 7', 8' to enable the surface alignment properties of the two layers to be tuned by the subsequent processing steps applied in order to ensure that the two alignment layers have substantially similar surface alignment properties, and particularly similar pretilt angles $\xi$, in the manufactured device, it is also possible for such tuning to be effected by utilising alignment layers of similar materials which are subsequently processed in different ways to provide alignment layers having similar surface aligment properties in the manufactured device.

We claim:

1. A method of manufacturing a ferroelectric liquid crystal device which comprises a cell including a layer of chiral smectic ferroelectric liquid crystal material contained between two substrates and at least one alignment layer for determining the surface alignment of the molecules in the liquid crystal material, the method including the steps of:

(a) selecting a suitable material for said alignment layer of the cell;

(b) filling the cell by introducing liquid crystal material between the substrates of the cell to which said alignment layer is applied; and (c) after filling of the cell, applying a heat treatment to the cell by raising the cell to an elevated temperature and maintaining the cell at said temperature for a predetermined period of time, said temperature and said period of time being selected to cause the surface alignment properties of said alignment layer to be changed by the heat treatment in such a manner as to promote adoption of the C2 state by the liquid crystal material on subsequent cooling to the device operating temperature.

2. A method according to claim 1, wherein the liquid crystal material is maintained at a raised temperature during filling of the cell, and the heat treatment is applied so as to increase the temperature of the cell after the cell has been filled and before the cell has cooled down to an appreciable extent.

3. A method according to claim 1, wherein the liquid crystal material is maintained at a raised temperature during filling of the cell, and the heat treatment is applied after the cell has been allowed to cool to a low temperature in the vicinity of room temperature.

4. A method according to claim 1, wherein, after application of the heat treatment, the cell is cooled at a slow rate, for example at a rate of 1° C. per minute, from a temperature above the chiral smectic phase transition temperature to a temperature below the chiral smectic phase transition temperature.

5. A method according to claim 1, wherein the heat treatment serves to heat the cell to a temperature at which the liquid crystal material is in the isotropic phase.

6. A method according to claim 1, wherein the material selected for said alignment layer is such as to impart a surface pretilt of more than 3° at room temperature prior to filling of the cell, and the heat treatment is such as to cause a surface pretilt of less than 3° to be imparted by said alignment layer after filling and cooling of the cell.

7. A method according to claim 1, wherein the material selected for said alignment layer is such as to impart a surface pretilt of less than 2° at room temperature prior to filling of the cell, and the heat treatment is such as to cause a surface pretilt of more 2° to be imparted by said alignment layer after filling and cooling of the cell.

8. A method according to claim 1, wherein said alignment layer has a surface pretilt in the range of 2° to 3° at room temperature after application of the heat treatment.

9. A liquid crystal device manufactured by a method according to claim 1.

* * * * *